United States Patent [19]

Helfrick

[11] Patent Number: 5,801,659
[45] Date of Patent: Sep. 1, 1998

[54] APPARATUS AND METHOD FOR COUPLING SATELLITE NAVIGATION SIGNALS TO A VOR SYSTEM

[75] Inventor: Albert Helfrick, Deland, Fla.

[73] Assignee: Dytech Limited Inc., Wayne, N.J.

[21] Appl. No.: 768,819

[22] Filed: Dec. 17, 1996

[51] Int. Cl.⁶ .............................. G01S 5/02; H04B 7/185
[52] U.S. Cl. ........................... 342/357; 342/49; 342/401
[58] Field of Search .......................... 342/49, 401, 404, 342/46, 357

[56] References Cited

U.S. PATENT DOCUMENTS

| | | | |
|---|---|---|---|
| 3,623,890 | 11/1971 | Gilbert et al. | 343/6 |
| 3,838,427 | 9/1974 | King et al. | 343/106 R |
| 4,069,412 | 1/1978 | Foster et al. | 364/448 |
| 4,674,051 | 6/1987 | Fuscher | 364/443 |
| 5,019,828 | 5/1991 | Schoolman | |
| 5,043,736 | 8/1991 | Darnell et al. | |
| 5,210,540 | 5/1993 | Masumoto | |
| 5,323,306 | 6/1994 | Storli et al. | 364/452 |
| 5,345,244 | 9/1994 | Gildea et al. | |
| 5,365,447 | 11/1994 | Dennis | |
| 5,434,787 | 7/1995 | Okamoto et al. | |
| 5,596,500 | 1/1997 | Sprague et al. | |

OTHER PUBLICATIONS

Helfrick, A. (1994) Modern Aviation Electronics, 2nd Ed., Prentice–Hall, Inc., Englewood Cliffs, New Jersey, pp. 156–188.

*Primary Examiner*—Thomas H. Tarcza
*Assistant Examiner*—Dao L. Phan
*Attorney, Agent, or Firm*—Klauber & Jackson

[57] ABSTRACT

A navigation and control apparatus having a link to a GPS device for receiving positional and navigational data therefrom, a converter to convert the GPS signals into a VOR format, and a VOR signal generator to transmit the converted signals to a VOR receiver aboard the aircraft.

20 Claims, 1 Drawing Sheet

APPARATUS AND METHOD FOR COUPLING SATELLITE NAVIGATION SIGNALS TO A VOR SYSTEM

FIELD OF THE INVENTION

The present invention relates to a navigational control apparatus and, more particularly, to a navigation apparatus that adds the capability of Global Navigation Satellite Systems (GNSS) technology to aircraft navigation and control systems employing conventional VOR technology.

DESCRIPTION OF THE PRIOR ART

Aircraft navigation and control systems utilize a variety of instruments to determine the position of the aircraft and chart its course. One such instrument is VOR, a VHF Omni-Range system, the workhorse of navigational systems today. VOR has been in use for over fifty years and there are now over a thousand VOR stations in the United States and about 3,000 in the rest of the world, providing a network of airways for aircraft guidance. With a VOR receiver, an aircraft can obtain course guidance to a given VOR station. Deviation from the direct path to the designated waypoint, i.e., whether the aircraft is to the left or right of the bearing is shown by the VOR's course deviation indicator (CDI). Although a completely separate and different system from VOR, the Federal Aviation Administration (FAA) has collocated or paired DME (distance measuring equipment) facilities with VOR facilities, providing a collocated VOR/DME signal with both azimuth and distance measurements.

A more recent and highly accurate tool used for aircraft navigation is a GNSS receiver, such as receivers for the Global Positioning System (GPS) as well as the Global Orbiting Navigational Satellite System (GLONASS), either of which can determine the three-dimensional position of an aircraft employing this technology anywhere on or in the vicinity of the earth with a very high degree of accuracy. As described in some detail in U.S. Pat No. 5,345,244 to Gildea et al., receivers employing this technology receive signals from one or more orbiting satellites and calculate the aircraft's position and time of observation of that position from these signals. The details of this process are set forth in Gildea et al. and other sources and will not be discussed herein. As in VOR, LORAN, an acronym for long-range radio navigation, and other such systems, GNSS devices can also determine other navigational information, such as cross track error, drift angle, wind direction and velocity, providing base information on heading and airspeed are first supplied.

Additional art in related areas includes Gildea et al., which describes an apparatus to receive and forward the digital satellite positional information to a display.

U.S. Pat. No. 5,043,736 to Darnell et al. describes a hand-held device for receiving GPS signals and relaying the position of the device, as well as the user, via a cellular phone signal to a base unit.

Storli et al., in U.S. Pat. No. 5,323,306, describes an apparatus for converting very low frequency LORAN signals to signals compatible with the standard Omni Bearing Selector (OBS) in the aircraft. LORAN is an example of hyberbolic navigation, the details of which are described in applicant's Modern Aviation Electronics, 2nd Edition, Prentice-Hall, Inc., Englewood Cliffs, N.J. (1994).

Schoolman, U.S. Pat. No. 5,019,828, describes a combined navigational and head-mounted display apparatus for individuals, providing the user with a stereoscopic view of terrain relative to the user's position.

Lastly, Okamoto et al., U.S. Pat. No. 5,434,787, describes a GPS measuring system which includes a mobile station which receives the GPS signals, converts the signals to an intermediate frequency band and transmits the converted signal to a base station.

One object of the present invention is to provide an aircraft navigational and control apparatus that receives positional and navigational information from a GNSS/GPS device and transmits that information via VOR signals to a standard VOR device within that aircraft. Particularly, it is an object of the present invention to enhance the capability of an aircraft's on-board conventional VOR system with the more recent GNSS/GPS tools now available.

It is a further object of the present invention that the navigation and control apparatus of the present invention be portable and easy to install and remove, allowing a pilot use of a given apparatus in a variety of aircraft.

Also, because of numerous Federal Aviation Regulations (FARs), such as those set forth in Chapter I of Title 14 of the Code of Federal Regulations, some of which impose substantial fines and even imprisonment for their violation, another object of the invention is that the navigation apparatus of the present invention comply with these FAA rules and regulations. Particularly, it is desired that the preferred embodiment of the present invention add to the capabilities of the existing navigation system of a given aircraft without the need for rewiring or other modification, and without the need for recertification by the FAA.

It is an additional object of the present invention that the navigation apparatus not use active VOR frequencies and instead utilize limited-use VOR test frequencies, thereby avoiding possible interference to or from active navigation. Interference is further avoided by use of a low-power VOR signal generator placed in close proximity to the on-board VOR receiver.

It is another object of the present invention that the navigation apparatus allow the autopilot in a VOR aircraft to operate using GNSS/GPS signal guidance.

SUMMARY OF THE INVENTION

In accordance with the preferred embodiment of the invention, a navigation and control apparatus includes a link to an aircraft's on-board GPS device for receiving positional and navigational data therefrom, a converter to convert the GPS signals into a VOR signal, and a VOR signal generator to transmit the converted signals to a VOR receiver aboard the aircraft.

BRIEF DESCRIPTION OF THE DRAWINGS

Other objects and advantages of the present invention will be apparent from the following detailed description of the presently preferred embodiments thereof, which description should be considered in conjunction with the accompanying drawings in which.

DETAILED DESCRIPTION OF THE PRESENT INVENTION

At present, many aircraft rely solely on conventional VOR technology for navigational guidance and are unable to utilize the enhanced capability of more recent systems incorporating GPS or other GNSS technology without expensive rewiring and recertification by the FAA. These aircraft are usually smaller aircraft owned, shared or rented by pilots who would like to acquire and utilize such new technology easily and inexpensively. The navigation and control apparatus of the present invention, called the OMNISAT, fills this need.

Figure 1:
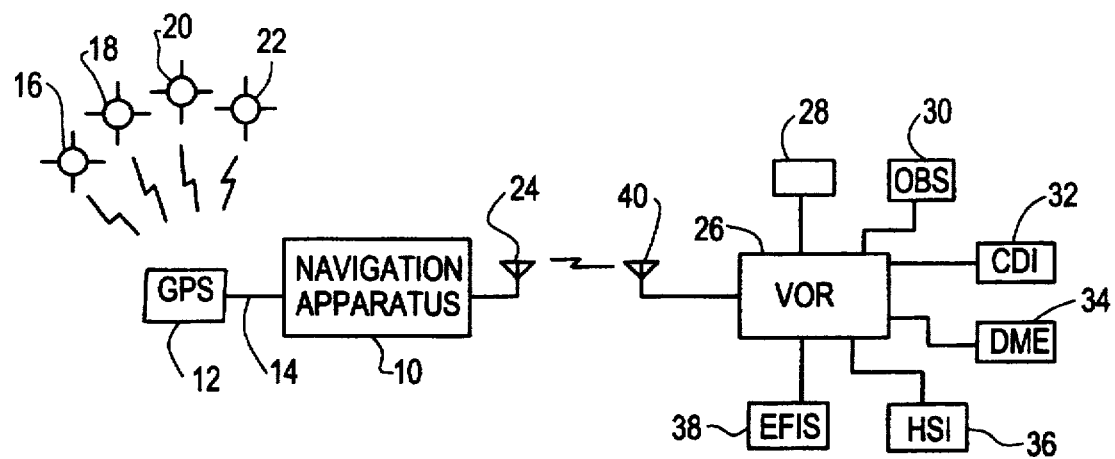
FIGS. 1 and 2 are schematic views of the preferred embodiment of the present invention
Figure 2:
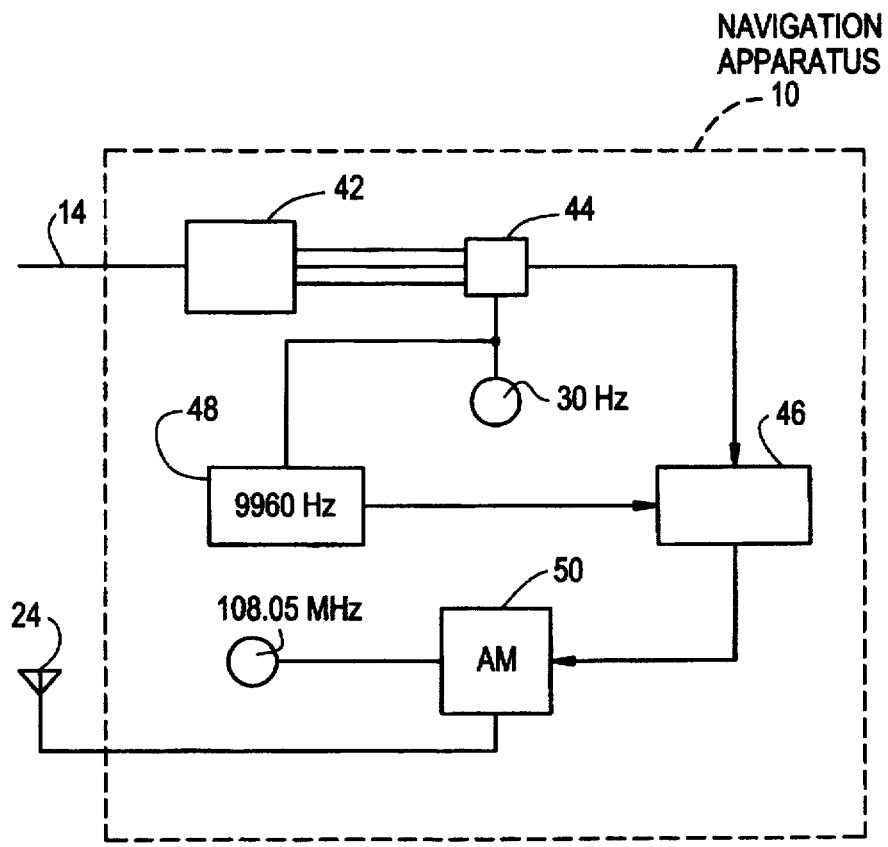

Schematic representations of the navigation apparatus 10 of the present invention are shown in FIGS. 1 and 2. The navigation apparatus 10 is preferably a portable unit which is physically connected only to a conventional GPS device 12 by a serial data line 14. The GPS device 12 receives positional information from a plurality of orbiting satellites 16, 18, 20 and 22 and based upon the satellites' spatial and timing configurations, positional information about the location of the GPS device 12 is computed. Although only three of the many orbiting satellites are necessary to pinpoint the three-dimensional coordinates of the aircraft, a fourth satellite is needed to correct for clock errors and significantly increase positional accuracy.

In addition to the positional or spatial information, the GPS device 12 provides navigational information, such as cross track error, along track error, velocity, distance and time-to-go (ETA), which are digitally forwarded across data line 14 of the navigation apparatus 10. The digital GPS signals are then processed and converted to a VOR format within the navigation apparatus 10, which then transmits the converted VOR signal through an antenna 24, or alternatively through a signal coupler (not shown), to an on-board conventional VOR receiver 26.

As shown in FIG. 1, the conventional VOR receiver 26 may include various peripheral systems capable of being coupled thereto, including an autopilot 28, an omni-bearing selector (OBS) for manual pilot bearing settings, a course deviation indicator (CDI) 32 for indicating relative direction, distance-measuring equipment (DME) 34, a horizontal situation indicator (HSI) 36, and an Electronic Flight Information System (EFIS) 38, which takes raw data from various other instruments, e.g., VOR, DME 34, etc., and displays symbolic representations for that data on a view screen. Since the functions of many of the aforementioned peripherals overlap, it should be understood that only one of the EFIS 38, HSI 36 and OBS 30/CDI 32 need be used simultaneously.

A VOR antenna 40, attached to the VOR receiver 26, receives a spectrum of VHF signals, particularly within the VOR range of about 108.00 MHz to about 117.95 MHz. At the low end of the VOR spectrum, channels 108.00 MHz and 108.05 MHz are reserved for testing purposes at airports. However, since the VOR test stations at those facilities only use low-power transmitters, the range of the test signal is short, e.g., a radius of a few miles around the airport. Since these frequencies, particularly 108.05 MHz, are infrequently used and very localized in nature, the use of this particular frequency by the navigation apparatus 10 of the present invention is preferred. Further, since only a low-powered radiated VOR output from the navigation apparatus 10 through the antenna 24 is all that is required to bridge the short intra-aircraft gap between the antennae 24 and 40, there is virtually no interference by or with other such apparatus 10 in other aircraft or with any ground navigational instrumentation.

Since the navigation apparatus 10 in its preferred embodiment is portable and requires a physical connection only with the GPS device 12, also preferably a hand-held portable unit, the navigation apparatus 10 can be easily transferred along with the GPS device 12 from aircraft to aircraft, and, when tuned to 108.05 MHz, the navigation apparatus 10 will interface with any VOR receiver 26. This portability and the advantage of requiring no interconnecting wires or other physical changes to existing instrumentation means that an aircraft equipped with the navigation apparatus 10 should require no FAA certification, as would an apparatus requiring modification of the existing instrumentation.

In addition to providing positional information, the VOR signal transmitted by the navigation apparatus 10 also provides a method of coupling course deviation information from the portable GPS device 12 to the conventional VOR receiver 26. Consequently, an on-board VOR receiver 26 receiving such signals can provide CDI information to a GPS waypoint as if the receiver 26 were flying a VOR radial. The navigation apparatus 10, if provided with a destination, can determine the required course to arrive at the destination, and can calculate the deviation from that course. The conventional VOR receiver 26 also determines deviation from a selected course except that the destination can only be the VOR ground station. Course deviation can also be provided for navigating away from the VOR ground station on a selected course radiating from the VOR.

The VOR receiver 26 provides an indication of the direction and amount of course error. The accepted method of navigating using a VOR is to correct the course error so that the course deviation indicator, CDI 32, shows zero. The conventional VOR CDI 32 shows an error as an angle of the selected course. Some instruments, such as the area navigation computer (RNAV) and the HSI 36, are also capable of presenting VOR-derived course deviation information and present this information as distance measured perpendicularly from the desired course to the aircraft. This method of presenting course deviation is called "cross track error" (XTE). Since the accepted procedure for navigation is to correct the aircraft track to reduce the course deviation to zero, indications of either distance or angle will provide accurate information.

There is sufficient information available from a GNSS receiver, such as the GPS device 12, that either angular course deviation or XTE information may be calculated and many such receivers allow the selection of either one. However, information available from a VOR signal alone is not sufficient to provide XTE. The addition of the distance to the VOR, which is provided from the DME 34 allows the calculation of XTE from VOR information. The GNSS-derived XTE permits the use of the HSI 36 or other devices requiring XTE without the need for DME 34.

The navigation apparatus 10 of the present invention provides two types of course deviation information. The first is proportional to the angular course error, which is shown on a VOR CDI 32. The second is cross track error (XTE) in distance. By changing the mode of the navigation apparatus 10 from angular to XTE, the CDI 32 of the VOR will indicate distance as if the CDI were interfaced with an RNAV computer. Further, if the aircraft has an HSI 36, true HSI operation occurs with the use of the navigation apparatus 10 by displaying cross track error without distance-measuring equipment (DME).

Implementation and use of the navigation apparatus 10 is simple. First, the GPS device 12 is connected via serial data line 14 to the apparatus 10, power for which may come from an internal battery pack or from aircraft power from about 14 to 28 volts. For optimum usage, the navigation apparatus 10 should be placed so that the antenna 24 is as close as practical to the navigation (NAV) antenna (not shown) on the aircraft to optimize VOR reception. Since the signal transmission distance between antennae 24 and 40 is so small, the navigation apparatus 10, although low-powered, should nonetheless deliver sufficient signal strength on small aircraft wherever it is located. For larger aircraft, careful placement may be required to get the best signal. Since the navigation antenna is often towards the rear of the aircraft, placing the navigation apparatus 10 near the rear window may be the best location. It should be noted that antenna 24 may extend away from the navigation apparatus 10 by means of a cable. Since the apparatus 10 has no operable controls requiring in-flight adjustment, placement away from the pilot should pose no problem. Of course, the VOR receiver 26 should be tuned to the same frequency of transmission from antenna 24, e.g., 108.05 MHz.

Once the navigation apparatus 10 has been placed to provide a strong signal, one must set the GPS device 12 for the desired navigational mode so that the full capability of the enhanced GPS device 12 can be used by the more conventional VOR system. For proper use of the navigation apparatus 10, the GPS device 12 must be given a course so that the course error calculations may be performed. To assure an accurate indication of the zero course deviation indication before using the navigation apparatus 10, one must select a destination and press the "direct to" navigation mode of the GPS device 12. This will insure a zero course deviation initially, and turn the OBS 30 of the VOR receiver operating with the navigation apparatus 10 for a centered display, which is zero degrees TO. Because of slight misalignments of the navigation (NAV) receiver (not shown), the CDI 32 may not center with an exact zero degree OBS. Nonetheless, the navigation apparatus 10 is not compromised by such misalignments, provided it is set to zero before use. Since the VOR receiver 26 can drift during flight, it would be prudent to periodically adjust it by pressing the "direct to" mode of the GPS, which provides the necessary zero course deviation and VOR adjustment.

The VOR receiver 26 can also be adjusted during flight without disturbance. Most GPS devices provide a cross track indicator where the range can be made quite sensitive. If the aircraft is flown using a coupled autopilot 28, simply adjust the OBS 30 so that the autopilot 28 causes the GPS device 12 to indicate zero XTE. If the aircraft is being flown manually, one must fly the aircraft to a zero XTE indication on the GPS device 12 and adjust the OBS 30 for a zero CDI 32. One should not, however, adjust the OBS 30 during flight except to calibrate the GPS device 12. Since the navigation apparatus 10 of the present invention uses stable digital technology, any significant drift will be from the NAV receiver. Indeed, all of the navigation parameters are set on the GPS device 12 while the navigation receiver is being used to couple the GPS device's advanced capability to the existing instruments and the autopilot 28.

As noted, the GPS device 12 calculates the various positional and navigational information and forwards the data along serial data line 14 to the navigation apparatus 10. The serial output from hand-held and other GPS devices 12 is in a standardized format, particularly RTCM format. RTCM, representing Radio Technical Commission for Maritime, is an internationally recognized group. In any event, the output data stream from the GPS device 12 to the navigation apparatus 10 is in a series of standard ASCII characters and enters at a standard baud rate, e.g., between 1200 to 9600 baud or higher. The output data includes one or more command strings which have the following format:

<STX><id><dddd><it><dddd><it>. . .
<id><dddd><it><ETX> where:
STX is the ASCII start of text character,
id is an item designator, such as uppercase G for XTE,
it is an item terminator, a carriage return or CR,
dddd is the data, which can be of fixed or variable length, and
ETX is the ASCII end of text character.

Turning our attention to FIG. 2, the bit stream of data from the GPS device 12 passing through the serial data line 14 enters a processor 42, such as a general-purpose microprocessor, within the navigation apparatus 10. Through the use of character recognition circuitry within the microprocessor 42, particular command characters are recognized within the plurality of command strings. For example, for XTE, microprocessor 42 looks for a "G" followed by five data words and a carriage return. In particular, the XTE command string has the following format:

G s d d d d CR where "s" is a one character sign for left or right, L or R, and "dddd" is a four character ASCII number representing the error in nautical miles with a 0.01 nautical mile resolution. Thus, the four digit numerical field ranges from Left 99.99 nmi to Right 99.99 nmi.

Accordingly, the character string "STX G R 0356 CR E 05234 CR ETX" has two commands. The first is the cross track error, XTE, indicating Right 3.56 nmi. The second, indicated by an "E", is the distance to an indicated waypoint of 523.4 nmi, the five data words between the item designator character ("E") and the item terminator character ("CR") representing the distance with a 0.1 nmi resolution. Thus, the five digit numerical field for distance ranges from 0000.0 to 9999.9 nmi.

It should be understood that the number and type of discrete commands within a character string between the STX and ETX characters is variable and dependent upon the particular functions enabled within the GPS device 12. For example, if the GPS device 12 cannot calculate a particular parameter, such as where the user has not indicated a waypoint, then there can be no distance or cross track error information since there is no "track" indicated. Instead, other available parameters, such as the GPS positional information in latitude, longitude and altitude, may be forwarded to the VOR equipment. Additionally, particular data characters or words may be replaced with an ASCII character dash, i.e., "-" to indicate that that data cannot be calculated. Furthermore, the navigation apparatus 10 of the invention is able to recognize situations such as loss of the GPS signal, and responds by removing the reference and variable modulation of the VOR signal, which in turn causes the navigation receiver to show a warning flag to indicate an unreliable signal.

As noted, the baud rate of the digital bit stream from the GPS device 12 to the navigation apparatus 10 may be set at an industry standard, such as a rate between 1200 to 9600 baud or more. Alternatively, the baud rate may be selectable or variable, in which case a baud rate detector should be added.

Cross track error refers to the perpendicular distance from the desired course to the aircraft. In aircraft navigation, cross track error is the parameter displayed by an area navigation computer or RNAV (not shown) or on the HSI 36. The navigation apparatus 10 of the invention in converting the GPS signals to VOR format provides a course deviation on VOR that is proportional to the distance from the desired track. VOR, on the other hand, operates differently and instead provides a course deviation proportional to the angle of deviation. This angle is the angular difference angle between a radial line drawn from the VOR transmitter to the aircraft and a radial line drawn from the VOR transmitter on a bearing set by the VOR equipment. Both the distance error and the angular error are displayed on the CDI 32, and the object is to fly the aircraft in a direction that will reduce the course deviation, either angular or distance, to zero, which places the aircraft on the proper course. Since the waypoint distance measurement is within the GPS signal data stream, the navigation apparatus 10 of the invention increases the use of the conventional VOR equipment by providing the CDI 32 with the course deviation proportional to either angle or distance. Accordingly, another task for the microprocessor 42 is to calculate the angle or course deviation error and providing the output to a phase shifter 44.

In order for the course deviation or other microprocessor output to be received by the VOR receiver 26 and displayed in the cockpit, the signal must modulate a standard VOR carrier. The signal generating circuitry used by the present invention is shown in FIG. 2, whereby two 30 Hz sine functions are used to modulate an RF carrier. The first sine function amplitude modulates the carrier in a conventional fashion at 30%, and is called the variable 30 Hz. The second since wave, the reference 30 Hz, frequency modulates a 9960 Hz subcarrier, which in turn also modulates the RF carrier. The VOR receiver 26 upon reception then demodulates the two 30 Hz waveforms and measures the phase angle between them. The angular course deviation is the phase angle between the two 30 Hz sine functions. Therefore, the CDI deviation is directly proportional to the phase angle between the two 30 Hz waveforms. The navigation apparatus 10 of the present invention emulates the VOR signal as received by an airborne aircraft and adjusts the phase angle to provide the desired CDI 32 display.

With further reference to FIG. 2, the phase shifter 44 phase shifts the aforementioned 30 Hz sine function by a given amount and forwards the variable signal to an analog summation circuit 46. A 9960 frequency modulated oscillator 48 is also modulated by the 30 Hz sine function, albeit without any phase shift, and the reference signal also forwarded to the circuit 46. Both the 30 Hz and the 9960 Hz modulations are added in the analog summation circuit 46, the output of which drives an amplitude modulator 50. The 30 Hz, 9960 Hz and their sum each modulates the RF carrier at the standard VOR test frequency. The amplitude modulator 50 generates a 108.00 or 108.05 MHz carrier signal which is transmitted through the antenna 24.

It should be understood that the coupling of the navigation apparatus 10 and the VOR receiver 26 need not be wireless, but may instead be permanently installed in the aircraft by hard-wiring the two. This is done by cutting the antenna cable to the NAV receiver and providing two connectors. The coupler for the navigation apparatus 10 is then placed in series with the NAV receiver antenna lead, which provides a through path for the NAV receiver while coupling to the signal for the navigation apparatus 10. Although such a modification requires FAA approval, the installation is very simple and the converted VOR signals are provided directly to the VOR receiver apparatus 26.

It should also be understood that the processor 42 of the present invention preferably has the capacity to handle the range of tasks required to transform the GNSS/GPS signals into corresponding VOR format signals, including receiving and decoding the stream of digital data from said GPS device 12, recognizing the various commands therein, calculating angle or distance course deviation error therefrom, and providing the output thereof to the phase shifter 44. It should additionally be understood that the above functions may be performed by a single or a plurality of discrete microprocessors. Alternatively, it should be understood that processor 42 may be a simpler and narrower-purpose shift register and decoder circuit instead of a general-purpose microprocessor.

It should be further understood that the navigation apparatus 10 of the present invention may also include the functionality of the GPS device 12 within it. In other words, microprocessor 42 may coordinate the reception of GPS signals by an internal GPS receiver, decode those signals, convert the signals into VOR format and forward the converted VOR signals to the VOR signal generator for transmission to the on-board VOR receiver 26.

Although a preferred embodiment of the present invention has been described and illustrated, along with modifications thereof, it will be apparent to those skilled in the art that additional modifications can be made without departing from the principles of the invention.

What is claimed is:

1. An onboard aircraft navigation apparatus for coupling signals received by a Global Navigation Satellite System (GNSS) device to a conventional VOR receiver aboard said aircraft, said navigation apparatus comprising:
    (a) signal linking means to said GNSS device for receiving GNSS signals therefrom;
    (b) converting means for converting said GNSS signals into VOR signals; and
    (c) a VOR signal generator for transmitting said VOR signals to said conventional VOR receiver.

2. The aircraft navigation apparatus as claimed in claim 1, wherein said GNSS signals are from a Global Satellite Positioning System.

3. The aircraft navigation apparatus as claimed in claim 1, wherein said GNSS signals are in RTCM format.

4. The aircraft navigation apparatus as claimed in claim 1, wherein said signal linking means is a serial data line.

5. The aircraft navigation apparatus as claimed in claim 4, wherein said serial data line receives said GNSS signals at a rate from about 1200 to about 9600 baud.

6. The aircraft navigation apparatus as claimed in claim 1, wherein said converting means comprises a microprocessor.

7. The aircraft navigation apparatus as claimed in claim 1, wherein said converting means comprises a shift register and decoder.

8. The aircraft navigation apparatus as claimed in claim 1, wherein said VOR signal generator comprises an antenna.

9. The aircraft navigation apparatus as claimed in claim 1, wherein said VOR signal generator transmits said VOR signals at a VOR test frequency.

10. The aircraft navigation apparatus as claimed in claim 9, wherein said VOR test frequency is about 108.00 MHz.

11. The aircraft navigation apparatus as claimed in claim 9, wherein said VOR test frequency is about 108.05 MHz.

12. The aircraft navigation apparatus as claimed in claim 6, wherein said converting means further comprises:
    (d) a digital phase shifter for phase shifting an output signal from said microprocessor; and
    (e) a modulating means for modulating a first sine function shifted by said digital phase shifter and an unshifted second sine function into a modulated signal.

13. The aircraft navigation apparatus as claimed in claim 12, wherein said second sine function frequency modulates a subcarrier.

14. The aircraft navigation apparatus as claimed in claim 12, wherein said converting means further comprises summation circuitry to sum said first and second sine functions.

15. The aircraft navigation apparatus as claimed in claim 12, wherein said converting means further comprises an amplitude modulator for generating a signal at a VOR test frequency.

16. The aircraft navigation apparatus as claimed in claim 12, wherein said VOR signal generator comprises an antenna which transmits said modulated signal while said microprocessor receives said GNSS signals through said signal linking means, and said antenna transmits an error message when said microprocessor does not receive said GNSS signals.

17. The aircraft navigation apparatus as claimed in claim 1, wherein said converting means comprises:

(d) processing means for receiving said GNSS signals and converting said GNSS signals into a plurality of VOR signals;

(e) a digital phase shifter;

(f) a sine generator at a first modulation frequency, a first sine function therefrom being phase shifted by said digital phase shifter, and a second sine function therefrom being unshifted;

(g) a frequency modulated oscillator having a subcarrier frequency modulated by said second sine function at said first modulation frequency;

(h) an analog summation circuit for summing said first and said second sine functions;

(i) an amplitude modulator driven by the output from said analog summation circuit; and (j) a carrier frequency generator, said carrier frequency modulated by the output from said analog summation circuit.

18. An onboard aircraft navigation apparatus for converting digital Global Navigation Satellite System (GNSS) signals to VOR signals for receipt by a conventional VOR receiver aboard said aircraft, said navigation apparatus comprising:

(a) a GNSS receiver for receiving said GNSS signals;

(b) converting means for converting said GNSS signals into VOR signals; and (c) a VOR signal generator for transmitting said VOR signals to said conventional VOR receiver.

19. The aircraft navigation apparatus as claimed in claim 18, wherein said GNSS receiver is a Global Satellite Positioning System (GPS) device.

20. A method for onboard coupling of digital signals from a Global Navigation Satellite System (GNSS) device to a conventional VOR receiver via a VOR signal, said method comprising the following steps:

(1) receiving a plurality of GNSS signals from said GNSS device;

(2) decoding at least one command within said plurality of GNSS signals;

(3) converting said at least one command to at least one corresponding VOR signal; and (4) transmitting said at least one VOR signal to said conventional VOR receiver.

* * * * *